June 3, 1969 T. F. SARAH 3,447,760
REMOVABLE LEVEL WIND FOR FISHING REELS
Filed April 12, 1967

INVENTOR.
THOMAS F. SARAH
BY Hamilton & Cook
ATTORNEYS

United States Patent Office 3,447,760
Patented June 3, 1969

3,447,760
REMOVABLE LEVEL WIND FOR FISHING REELS
Thomas F. Sarah, Akron, Ohio, assignor to Pflueger Corporation, Akron, Ohio, a corporation of Ohio
Filed Apr. 12, 1967, Ser. No. 630,435
Int. Cl. A01k 89/04
U.S. Cl. 242—84.42
5 Claims

ABSTRACT OF THE DISCLOSURE

A reel of the bait casting type having a level wind including at least a line guide and line guide block which are removable from the reel without necessitating disassembly of the reel itself. The line guide block, which carries the line guide, is solely supported on the double-threaded traversing shaft and guard therefor. Engagement of a stabilizer on the level wind with a frame pillar disposed parallel to and spaced apart from the traversing shaft maintains the desired orientation of the level wind. The guide block is separable to permit it to be swung out of engagement with its supporting traversing shaft and guard therefor about an arc centered at the pillar engaged by the stabilizer.

Background of the invention

Level wind mechanisms engage the fishing line and, by traversing back and forth in front of the line spool as the reel is rotated to retrieve the line, cause the line to be uniformly received across the lateral extent of the spool. Such mechanisms are well known to the art and have received wide acceptance for use with fresh water bait casting reels.

However, for salt water bait casting reels level wind mechanisms, while desirable, have not been acceptable.

When retrieving a line a considerable amount of the water which adheres thereto is removed by the line engaging the line guide through which it passes. This water flows over the line guide, guide block and eventually onto the traversing shaft and the pawl, which engages the double, or crossover, threads on the traversing shaft to reciprocate the level wind therealong.

Much of this water evaporates. In fresh water this evaporation causes little difficulty that modest maintenance of the reel won't preclude. In salt water the high mineral, and particularly salt, content creates a considerable residue, or mineral deposit, as the water evaporates. Experience has shown that while initially the level wind mechanism works quite well and is therefore highly desirable, after only nominal usage the residue fouls the traversing shaft, pawl and the supporting mechanism on which the guide block slides to such an extent that the level wind jambs. When this occurs the entire reel becomes inoperative.

Nor is it practical with prior known constructions to remove the level wind periodically through a fishing day and clean the critical parts. To remove the level wind from commercially practicable bait casting reels has heretofore required disassembly of the reel at least to the extent of removing the end plate. This is a tedious task not at all suited to periodic, on-the-spot maintenance. Accordingly, salt water fishermen have foregone the use of level wind mechanisms and have reverted to the awkward, and inconvenient, use of one hand both to support the rod and reel and guide the line onto the desired location across the spool while turning the reel handle with the other hand.

Summary of the invention

It is therefore a primary object of the present invention to provide a level wind suitable for salt water as well as fresh water use.

It is a further object of the present invention to provide a level wind, as above, which is readily mountable on and demountable from a reel without requiring disassembly of the reel on which it is used.

These and other objects which will become apparent from the following specification are accomplished by means hereinafter described and claimed.

In general, the present invention relates to fishing reels of the bait casting type. Such reels have a revolving spool upon which the line is wound during retrieval. The present invention is directed particularly to a level wind mechanism for such a reel. The level wind has a guide block a portion of which forms a bight which is receivingly positionable about a traversing shaft journaled parallel to the line spool between the end plates of the reel and rotatable in coordination with rotation of the spool. A blocking tab is selectively positionable across the bight to retain the traversing shaft therein.

Pawl means are carried in the guide block to engage the threads on the traversing shaft in order that the guide block will reciprocate along the traversing shaft in response to rotation of the latter. A line guide carried on the guide block can thus uniformly direct the line onto the spool during retrieve.

A stabilizer is also provided to baalnce, or maintain the orientation of the guide block supported solely by the traversing shaft, or its guard. The stabilizer is carried outwardly of the guide block and slidably engages one of the pillars connected between the end plates of the reel.

The configuration of the bight is such that with the blocking tab removed the guide block can be swung in an arc about the pillar engaged by the stabilizer to free the guide block therefrom for removal from the reel.

One preferred embodiment is shown by way of example in the accompanying drawings and is described in detail without attempting to show all of the various forms and modifications in which the invention might be embodied; the invention being measured by the appended claims and not the details of the specification.

Description of a preferred embodiment

Figure 1:
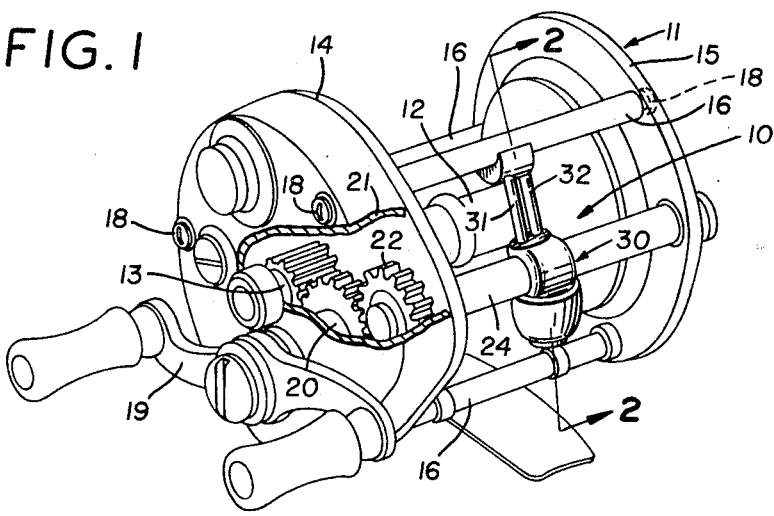
FIG. 1 is a perspective of a bait casting reel, partly broken away, embodying the concept of the present invention.

Referring more particularly to the drawings, a level wind, indicated generally by the numeral 10, is shown mounted on a conventional bait casting reel 11. The reel 11 has a line spool 12 fixed on a spool shaft 13 journaled in the front and back plates 14 and 15. The front and back plates 14 and 15 are, in turn, secured together to form a reel frame by a plurality of pillars 16 extending therebetween and to which they are attached by pillar screws 18.

The crank 19 is mounted on a drive shaft 20 laterally offset from the spool shaft 13 and is operatively connected thereto by a conventional gear train housed between the front plate 14 and the cap 21.

A pinion 22 is operatively connected to the aforesaid gear train and rotates a traversing shaft 23 journaled in, and extending between front and back plates 14 and 15. A guard, or slide mount, 24 having an opening 25 extending axially of the slide mount embraces the traversing shaft 23 and is fixed between the plates 14 and 15.

The traversing shaft 23 is provided with double, or crossover, threads 26 so that a pawl means 28 carried in the level wind 10 and meshed with the threads 26 will cause the level wind 10 to reciprocate along the axial extent of the shaft 23 upon rotation thereof. Bait casting reels, as heretofore generally described, are well known to the art.

Figures 2, 3:
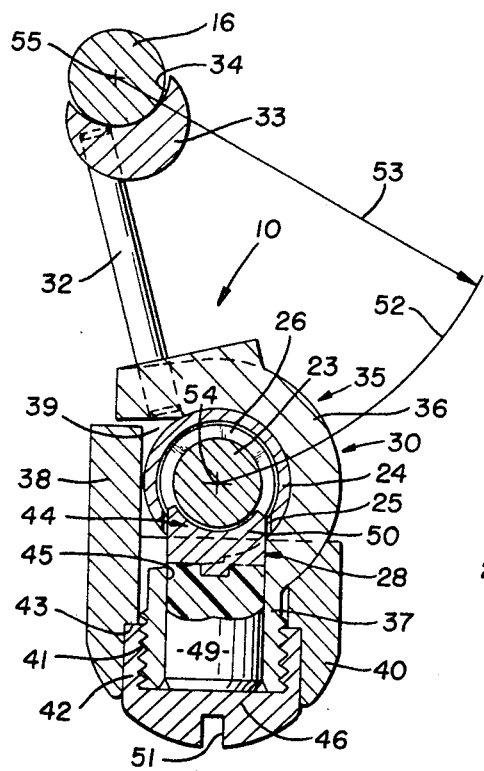
FIG. 2 is an enlarged cross section taken substantially on line 2—2 of FIG. 1.
FIG. 3 is an enlarged partial front elevation of the reel depicted in FIG. 1.

As is best seen in FIG. 2 the unique level wind 10 has three major components: a guide block assembly, indicated generally by the numeral 30, which embraces and reciprocally slides along the slide mount 24; a line guide, which may comprise a pair of parallel arms 31 and 32 extending outwardly from the guide block assembly 30 to embrace a fishing line therebetween; and, a stabilizer 33 which, to prevent movement of the guide block assembly 30 in any direction other than axially along the slide mount 24, engages one of the pillars 16. In the embodiment depicted the stabilizer 33 is of crescent-shaped, concavo-convex, cross section with the concave surface 34 engaging the cylindrical outer surface of one of the pillars 16. While the stabilizer 33 may contact any convenient pillar, a most suitable arrangement results with the stabilizer 33 mounted across the outer ends of arms 31 and 32 to engage that pillar 16 next adjacent the ends thereof.

The guide block assembly 30 has a frame 35 with a portion 36 of generally sickle-shaped cross section which slidingly embraces the mount 24. It should here be noted that whereas in the preferred embodiment the frame 35 is embracingly positioned in juxtaposition with the slide mount 24, the frame 35 may directly embrace the traversing shaft 23. One end of the sickle-shaped frame portion 36 terminates in a shank portion 37 which extends substantially radially of the mount 24 and the traversing shaft 23 housed therein.

A blocking tab 38 at least partially spans the open side of the bight 39 formed by the sickle-shaped frame 35 to lie adjacent the slide mount 24 and retain it within the bight 39.

The blocking tab 38 is an axial extension of a collar 40 which is bored to be positioned over the shank 37. The radially outer surface of the shank 37 has a threaded portion 41 onto which a nut 42 is received. The nut 42 also engages a shoulder 43 counterbored into the interior of the collar 40 to retain the blocking tab 38 positioned across the bight 39, as described above.

A pawl 44 is rotatably mounted in a bore 45 which extends axially through the shank 37, and it too is retained in position by engagement with a cap portion 46 of the nut 42 which spans the distal end of the shank 37.

While any number of pawl constructions are known to the art, it has been found most advantageous to utilize a cylindrical pivot 49 of a low friction plastic material, such as Delrin, into the end of which is fixedly mounted a long wear, preferably metal, tongue 50. The tongue 50 meshes with the threads 25 so that the level wind 10 is translated axially along the slide mount upon rotation of the traversing shaft 23. The pivot 49 turns easily in bore 46 so that the tongue 50 is able to accommodate the slope of the threads 25, and particularly the change in the direction thereof at each end of the shaft 23, with the minimum of resistance.

In order to remove the level wind from the reel for cleaning, the fisherman need only unscrew the nut 42. This can be accomplished by the use of a screw driver, dime, or other convenient substitute screw driver, in the slot 51 provided in the cap portion 46 of the nut 42. With the nut 42 removed the pawl 48 can be disengaged from the traversing shaft 23 and the collar 40 and attached blocking tab 38 can be withdrawn over the shank 37.

With the blocking tab 38 thus withdrawn the frame 35 can be swung along an arc 52 generated about that pillar 16 engaged by stabilizer 33; the use of a concave surface 34 on the stabilizer 33 to engage the cylindrical pillar 16 contributing to accomplishment of this arcuate movement of the frame 35. It is mandatory that the bight 39 be of such configuration that the arc it defines as the frame 35 is swung be congruent with an arc having a radius 53 defined by the span between the center 54 of the slide guide 24 and the center 55 of pillar 16 engaged by the stabilizer 33.

As soon as the slide mount 24 clears the bight 39, the frame 35, line guide arms 31 and 32 and the stabilizer 33 can be separated as a unit from the reel.

Once so separated, the pawl can be easily extracted from the bore 45 in shank 37 so that any residual deposit on either can be removed. At the same time the traversing shaft can be more easily cleaned with the level wind 10 removed. After the parts have been cleaned the level wind may very easily be reassembled on the reel by simply reversing the removal process.

It should now be apparent that a level wind constructed according to the concept of the present invention may be very easily mounted on and demounted from a reel without requiring any disassembly of the reel itself.

I claim:

1. In a reel of the bait casting type having a revolving spool upon which line is wound during retrieval, said spool being journaled in end plates connected by pillars extending generally parallel to the rotational axis of the spool, a traversing shaft having crossover threads journaled between said end plates and operatively connected to rotate at least upon winding rotation of said spool, the improvement consisting of a removable level wind comprising, a frame having a sickle-shaped bight opening toward said spool and positionable embracingly about said traversing shaft, a shank on said frame extending outwardly from the sickle-shaped portion generally radially of the traversing shaft received therein, a pawl means mounted in said shank and meshing with the threads on said traversing shaft, a line guide secured to said frame, stabilizing means mounted from said frame and slidably engaging at least one of said pillars to permit said frame to be swingable along an arc generated about said pillar, and a blocking tab selectively positionable across said bight to retain the traversing shaft positioned embracingly therein, said tab being an extension of a collar, positionable over said shank and removably mounted thereon radially of the traversing shaft, securing means demountably attaching said collar to said shank.

2. In a reel of the bait casting type having a revolving spool upon which line is wound during retrieval, said spool being journaled in end plates connected by pillars extending generally parallel to the rotational axis of the spool, a traversing shaft having crossover threads journaled between said end plates and operatively connected to rotate at least upon rotation of said spool, the improvement consisting of a removable level wind comprising, a frame having a sickle-shaped bight positionable embracingly about said traversing shaft, a shank on said frame extending outwardly from the sickle-shaped portion generally radially of the traversing shaft received therein, a pawl means mounted in said shank and meshing with the threads on said traversing shaft, a line guide secured to said frame, stabilizing means mounted from said frame and slidably engaging at least one of said pillars to permit said frame to swing along an arc generated about said pillar when said blocking tab is removed and said bight is oriented generally concurrent with said arc and a blocking tab selectively positionable across said bight to retain the traversing shaft positioned embracingly therein, said blocking tab being an extension of a collar removably mounted on said shank, thread means on the outer surface of said shank, and nut means demountably received on said threads to secure the collar on said shank.

3. In a reel, as set forth in claim 2, a level wind in which the pawl is received in a bore axially through said shank and said nut means has a cap portion spanning the distal end of said shank to retain said pawl means in said shank.

4. In a reel, as set forth in claim 3, in which at least that pillar engaged by said stabilizing means is cylindrical and in which the stabilizing means is mounted on said line guide and has a concave surface slidably engaging said cylindrical pillar.

5. In a reel, as set forth in claim 4, a level wind in which the frame engages a slide mount encasing the traversing shaft and the pawl means extends through an opening extending axially of the slide mount to mesh with the threads on said traversing shaft.

References Cited
UNITED STATES PATENTS

| | | | |
|---|---|---|---|
| 1,692,466 | 11/1928 | Pflueger et al. | 242—84.42 |
| 1,740,222 | 12/1929 | Broadwell et al. | 242—84.42 |
| 1,814,234 | 7/1931 | Thorpe | 242—84.42 |
| 1,819,723 | 8/1931 | Thorpe et al. | 242—84.42 |

BILLY S. TAYLOR, *Primary Examiner.*

U.S. Cl. X.R.

242—158.3